United States Patent
Beattie et al.

(10) Patent No.: US 7,134,103 B2
(45) Date of Patent: Nov. 7, 2006

(54) METHOD, SYSTEM, AND PRODUCT FOR VERIFYING VOLTAGE DROP ACROSS AN ENTIRE INTEGRATED CIRCUIT PACKAGE

(75) Inventors: Michael Werner Beattie, Austin, TX (US); Anirudh Devgan, Austin, TX (US); Byron Lee Krauter, Leander, TX (US); Hui Zheng, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 309 days.

(21) Appl. No.: 10/738,708

(22) Filed: Dec. 17, 2003

(65) Prior Publication Data

US 2005/0138584 A1    Jun. 23, 2005

(51) Int. Cl.
*G06F 17/50* (2006.01)
(52) U.S. Cl. .................................. 716/2; 716/5; 716/7
(58) Field of Classification Search .................... 716/2, 716/5, 7
See application file for complete search history.

(56) References Cited

U.S. PATENT DOCUMENTS

| | | | | |
|---|---|---|---|---|
| 5,598,348 | A * | 1/1997 | Rusu et al. | 716/2 |
| 6,134,513 | A * | 10/2000 | Gopal | 703/14 |
| 6,311,147 | B1 * | 10/2001 | Tuan et al. | 703/18 |
| 6,675,139 | B1 * | 1/2004 | Jetton et al. | 703/17 |
| 6,842,727 | B1 * | 1/2005 | Hayashi | 703/18 |
| 2003/0057966 | A1 * | 3/2003 | Shimazaki et al. | 324/628 |

* cited by examiner

*Primary Examiner*—Stacy A. Whitmore
(74) *Attorney, Agent, or Firm*—Duke W. Yee; Casimer K. Salys; Theodore D. Fay, III

(57) ABSTRACT

A method, system, and product are disclosed for determining a voltage drop across an entire integrated circuit package. A geometric description of the entire integrated circuit package is determined. The description is subdivided into non-uniform areas. A resistance of each one of the non-uniform areas is determined. A resistive netlist of the entire integrated circuit package is then determined by combining the resistance of each one of the non-uniform areas. The package is then simulated utilizing the netlist to determine the voltage drop across the entire integrated circuit package.

42 Claims, 6 Drawing Sheets

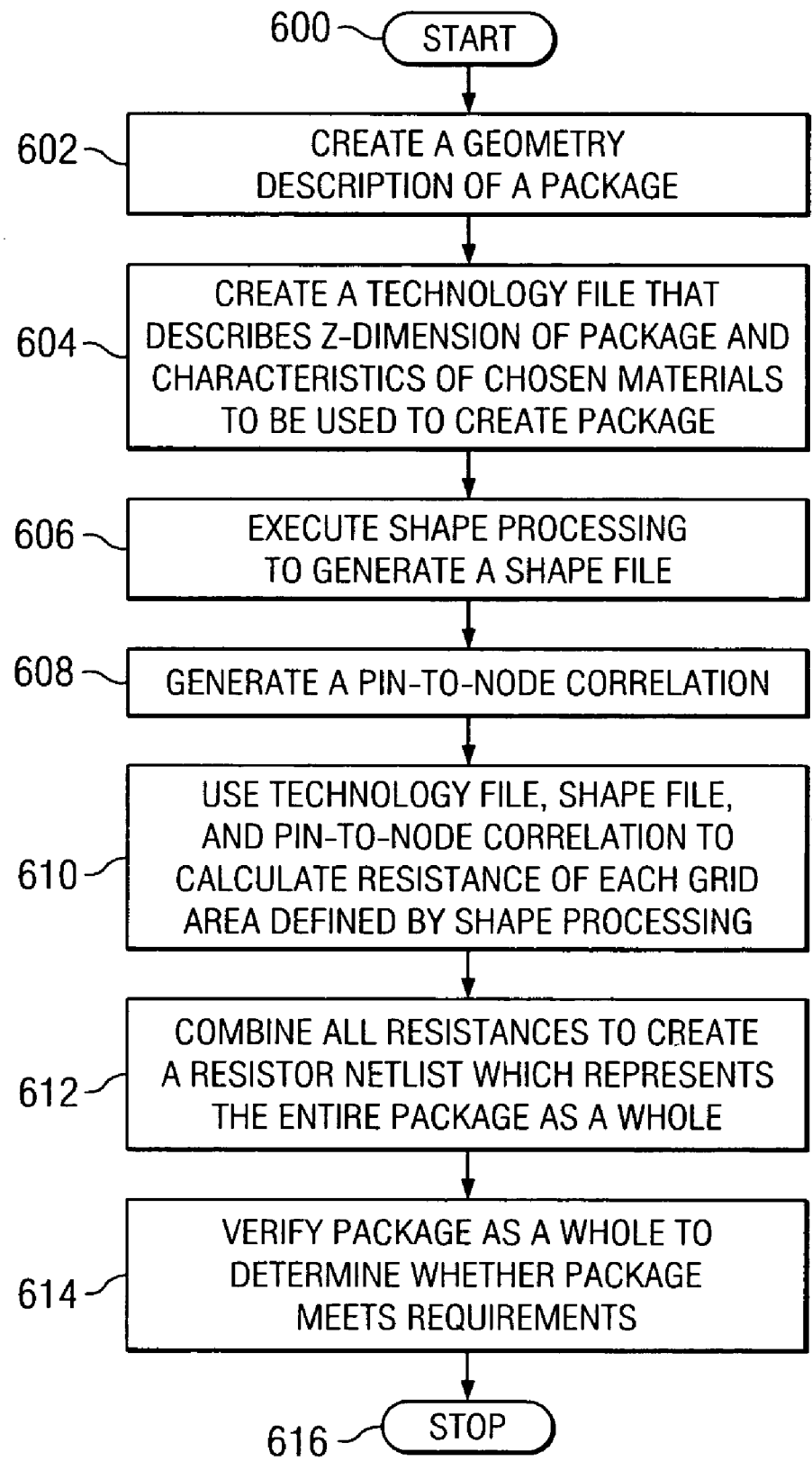

METHOD, SYSTEM, AND PRODUCT FOR VERIFYING VOLTAGE DROP ACROSS AN ENTIRE INTEGRATED CIRCUIT PACKAGE

BACKGROUND OF THE INVENTION

1. Technical Field

The present invention relates generally to the field of integrated circuit package verification, and more specifically, to a method, system, and computer program product for verifying a full integrated circuit package by efficiently determining the voltage drop across the entire integrated circuit package for multiple different kinds of packages.

2. Description of Related Art

Integrated circuits are coupled to a substrate utilizing an integrated circuit package. The package is responsible for supplying power to the integrated circuit, and physically supplying the circuit's signals out of the chip to the substrate. In order to accomplish this, the package may be very complex. For example, it is not unusual to have 24 or more levels of wiring within the package.

The package itself can affect the performance of the integrated circuit to which it is coupled particularly as power supply currents, power densities, and operating frequencies increase. The effect a package has on the performance of an integrated circuit needs to be measured. This measurement process is further complicated because many systems utilize ASICs which use a large number of custom integrated circuit packages which require fast and comprehensive analysis framework. Hardware failures, due to an inadequate package power grid, have not been detected by previous package verification approaches.

The difficulties with verifying packages apply to both ceramic and organic packages. To complicate package verification further, organic packages present more difficult challenges. The planes in the power and ground layers tend to be irregularly shaped in organic packages. Organic packages are often preferred for ASIC integrated circuits. Because more and more ASIC integrated circuits are being used, there is a need to efficiently and accurately verify large numbers of organic packages.

The current prior art is inadequate for verifying ceramic or organic packages. Ceramic packages tend to have mesh planes. Current verification techniques for verifying ceramic packages do not verify the entire package as a single unit. The current techniques verify only a portion of the ceramic package at a time. The results of verifying only a portion of a package at a time can be misleading. The current techniques for verifying organic packages require manual gridding of the planes in each layer because the layers are made up of irregular shapes. Manual gridding is inefficient and error-prone. Further, it is inefficient to require one framework for verifying ceramic packages and a different framework for verifying organic packages.

Therefore, a need exists for a method, system, and computer program product for verifying a full integrated circuit package by efficiently determining the voltage drop across the entire integrated circuit package using the same framework for multiple different kinds of packages.

SUMMARY OF THE INVENTION

A method, system, and product are disclosed for determining a voltage drop across an entire integrated circuit package. A geometric description of the entire integrated circuit package is determined. The description is subdivided into a plurality of non-uniform areas. A resistance of each one of the non-uniform areas is determined. A resistive netlist of the entire integrated circuit package is then determined by combining the resistance of each one of the non-uniform areas. The package is then simulated utilizing the netlist to determine the voltage drop across the entire integrated circuit package.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 6 depicts a high level flow chart which illustrates verifying a voltage drop across an entire integrated circuit package as a whole in accordance with the present invention;

DETAILED DESCRIPTION OF THE PREFERRED EMBODIMENT

Figure 1:
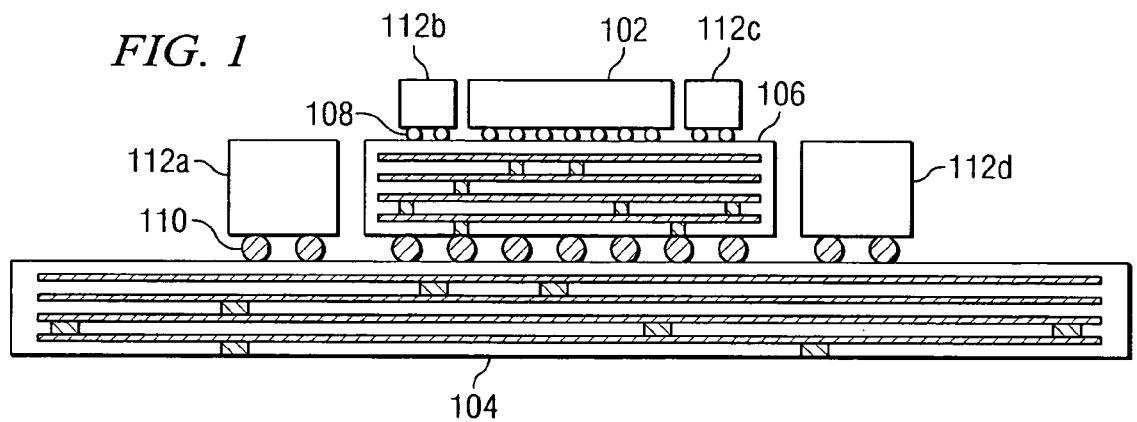
FIG. 1 is a block diagram of an integrated circuit coupled to a printed circuit board utilizing an integrated circuit package in accordance with the present invention.

A preferred embodiment of the present invention and its advantages are better understood by referring to the figures, like numerals being used for like and corresponding parts of the accompanying figures.

The present invention is a method, system, and computer program product for determining a voltage drop across an entire integrated circuit package taken as a whole using a single resistive network that represents the entire package. A geometric description of the wiring layers of the package is first generated. A resistive netlist of the entire integrated circuit package is determined by first dividing each layer in the description into a plurality of areas, such as discrete planes, lines, and vias. The areas may or may not be uniformly sized. The resistance of each area is then determined. The resistance that represents each via that is used to interconnect the layers is determined. The resistances of the areas of each layer and the resistances of the vias are then combined to create a single resistive netlist that represents the package as a whole. The package is then simulated using the resistive netlist in order to determine whether the package meets expected requirements.

The present invention may be used to determine the voltage drop across different types of integrated circuit packages. Both ceramic and organic packages may be simulated using the present invention. Planes or wires having regular or irregular shapes may be simulated.

The present invention recursively bisects each plane in a layer using a bounding box and then shrinks the bounding box to fit the plane until either a minimum sized bounding box occurs, or the percentage of the bounding box occupied by a solid shape exceeds a preset threshold and the bounding box is smaller than the maximum size. By performing this recursive process on each plane in a layer, a grid of non-uniformly-sized bounding grid boxes results. Thus, the irregular planes may be analyzed using the present invention.

An integrated circuit package includes one or more interconnected layers. These layers are electrically connected to each other using vias. Each layer includes multiple planes. These planes may be irregularly shaped. The present invention divides each layer into a grid of areas that may be uniform or non-uniform. The resistance of each area of each layer is then determined. Thus, each grid area is represented using a resistor. The way each grid area is electrically connected to the other grid areas is used to determine how to link the resistances for the layers. Therefore, a grid area in a layer is electrically connected to one or more grid areas within that same layer. In addition, some grid areas in one layer are electrically connected to grid areas in other layers using a via. These vias are also represented using resistors. A resistive netlist is then created which includes the resistances determined for each grid area and each via. The resulting resistive netlist, therefore, represents each layer included in the package as well as the manner in which these layers are connected together. The resulting resistive netlist represents the entire integrated circuit package as a whole. Package voltage verification may then be executed repeatedly during the package design process using the resistive netlist of the present invention. Current is applied to all electrical connections on the top of the package while the electrical connections on the bottom of the package are shorted. DC analysis is performed to ensure that the voltage drop throughout the package is below the acceptable limit for a given integrated circuit power.

FIG. 1 is a block diagram of an integrated circuit 102, also called a chip, coupled to a printed circuit board 104 utilizing an integrated circuit package 106, also called a substrate, in accordance with the present invention. Integrated circuit 102 is electrically coupled to package 106 using connections 108. Package 106 is electrically coupled to board 104 using connections 110. Connections 108 and 110 are preferably solder ball arrays. Other electronic devices, such as capacitors 112a–112d, may also be coupled to package 106 and/or board 104.

Figure 2:
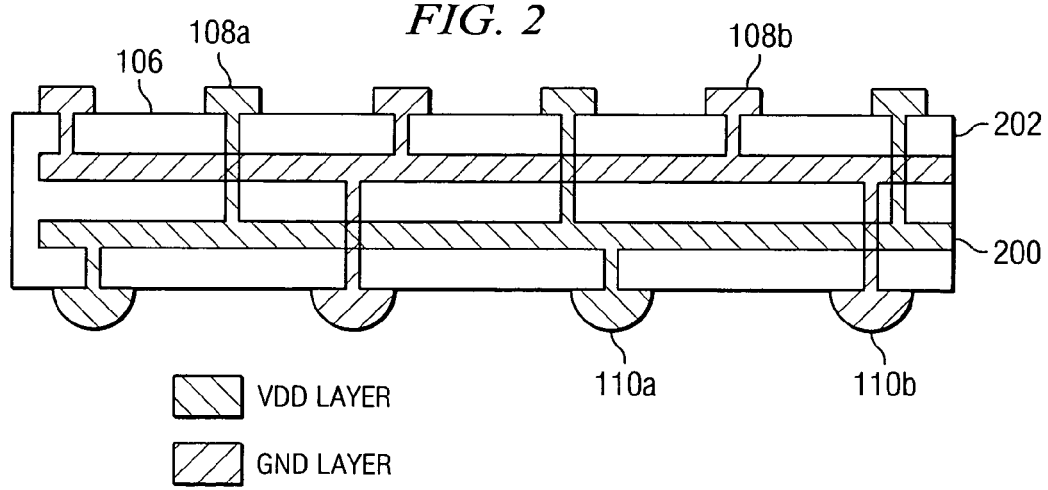
FIG. 2 is block diagram of a power layer and a ground layer in an integrated circuit package in accordance with the present invention.

FIG. 2 is block diagram of a power layer 200 and a ground layer 202 in an integrated circuit package in accordance with the present invention. Package 106 is made up of two or more independent power nets, such as power layer 200 and ground layer 202. Each power net has multiple connections on the top of package 106 to couple package 106 to an integrated circuit and multiple connections on the bottom of package 106 to couple package 106 to a board 104. The connections on the top and bottom of package 106 are interconnected by mesh layers of metal and vias between them for ceramic packages or solid layers of metal and vias between them for organic packages.

Power layer 200 provides electrical connection 108a to an integrated circuit 102 and electrical connection 110a to a board 104. Ground layer 202 provides electrical connection 108b to integrated circuit 102 and electrical connection 110b to board 104.

Figure 3:
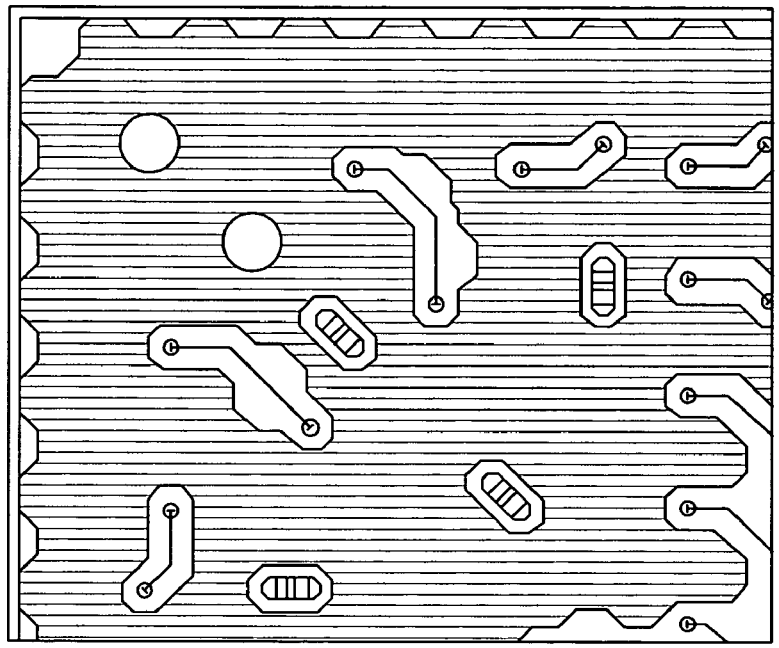
FIG. 3 is a top view of a power layer included in an integrated circuit package in accordance with the present invention.
Figure 4:
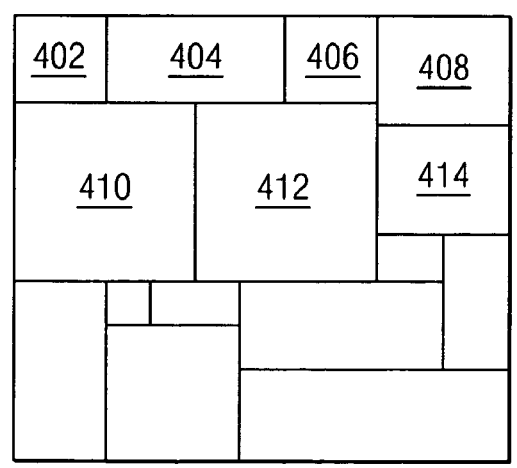
FIG. 4 is a top view of a plurality of non-uniform areas used to divide a wiring layer into discrete portions in accordance with the present invention.
Figure 5A:
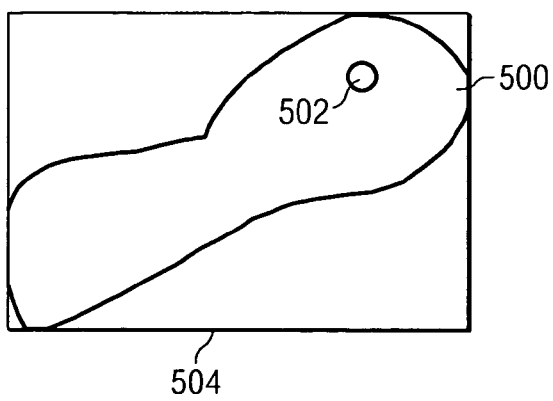
FIGS. 5a–5d depict an irregular plane being recursively bisected using a bounding box that is then shrunk to fit the plane until either the minimum size bounding box occurs, or the percentage of the bounding box occupied by a solid shape exceeds a preset threshold and the bounding box is smaller than the maximum size in accordance with the present invention.
Figure 5B:
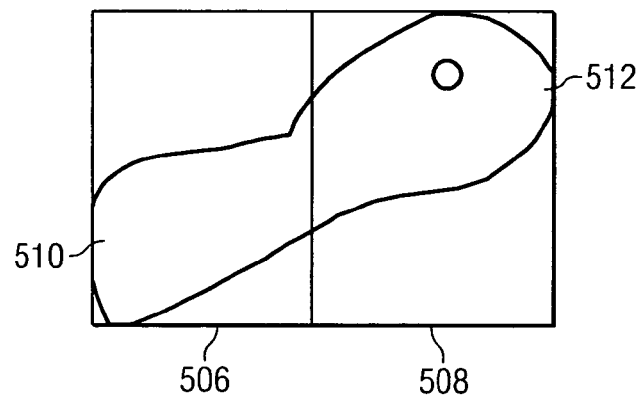
Figure 5C:
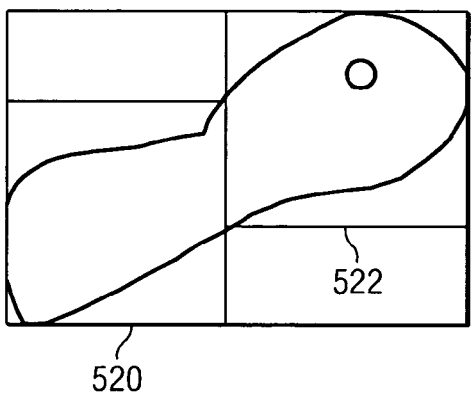
Figure 5D:
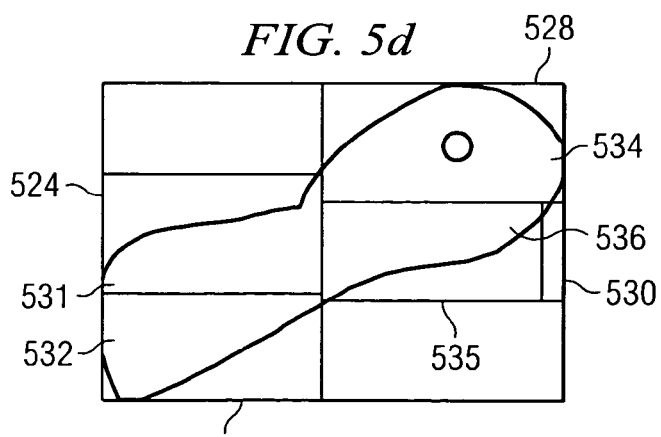

FIG. 3 is a top view of a power layer 300 included in an integrated circuit package in accordance with the present invention. Power layer 300 includes many irregular planes, or shapes, located at non-uniform locations. The present invention may be used to verify a package that includes this layer using non-uniform areas, such as the grid depicted in FIG. 4. The grid 400 of FIG. 4 is created in order to divide a power layer into discrete areas. The blocks of grid 400 are not uniformly shaped. The size of each block of grid 400 is determined according to the size and shape in the power layer being analyzed. Thus, the resulting grid 400 has multiple different sized blocks, such as blocks 402-414. Grid 400 is an example grid and does not correspond to the shapes of FIG. 3.

A user may specify a minimum and a maximum size for bounding blocks. The present invention then analyzes the shapes of a plane in order to generate an optimum grid of areas to use to create a resistive network. A bounding box is provided that approximately bounds a shape. The bounding box is then shrunk to fit the shape. Thereafter, the bounding box is bisected resulting in two new bounding boxes. Each resulting bounding box is then treated as a separate bounding box that bounds a new, separate shape. Each resulting bounding box is then shrunk if necessary so that it fits the shape inside the box. Each shrunken bounding box is then bisected to create two new bounding boxes. This process continues repeating itself until either the minimum sized bounding box results, or the percentage of the bounding box occupied by the solid shape exceeds a preset threshold and the bounding box is smaller than the maximum size specified for bounding boxes. This process is depicted in more detail with reference to FIGS. 5a–5d.

FIGS. 5a–5d depict an irregular plane being recursively bisected using a bounding box and then shrinking the bounding box until either the minimum size bounding box occurs or the percentage of the bounding box occupied by the solid shape exceeds a preset threshold and the bounding box is smaller than the maximum size. The present invention provides an adaptive bisection based gridding method used to divide a plane into optimum-sized bounding boxes for each irregular shape. In this manner, the present invention does not require a predefined grid and will work with arbitrary planes having arbitrarily located voids, such as void 502.

An irregular shape 500 that includes a void 502 is depicted. A first bounding box 504 is used to enclose shape 500. A determination is made that the percentage of shape 500 that occupies box 504 is below a preset threshold. Therefore, box 504 is bisected to create two new smaller bounding boxes 506 and 508. Again, a determination is made that portion 510 of shape 500 that occupies box 506 is below a preset threshold. And, portion 512 that occupies box 508 is also below a preset threshold. Therefore, boxes 506 and 508 are shrunk to fit the shape inside the bounding box creating two new smaller bounding boxes 520 and 522. Thus, box 506 is shrunk to fit shape 510 resulting in the creation of box 520. Box 508 is shrunk to fit shape 512 resulting in the creation of box 522. Boxes 520 and 522 are then bisected to create boxes 524, 526, 528 and 530. Box 530 is then shrunk to fit its shape resulting in the creation of box 535. At this point, portion 531 that occupies box 524 is above the threshold, portion 532 that occupies box 526 is above the threshold, portion 534 that occupies box 528 is above the threshold, and portion 536 that occupies box 535 is above the threshold. Therefore, shape 500 has been recursively divided until the grid depicted by FIG. 5d results.

FIG. 6 depicts a high level flow chart which illustrates verifying a voltage drop across an entire integrated circuit package as a whole in accordance with the present invention. The process starts as depicted by block 600 and thereafter passes to block 602 which illustrates creating a two-dimensional geometric description of an integrated circuit package including a description of the planes and wires for each wiring layer, such as power and ground layers. This process may be performed using a commercially available tool such as Allegro, available from Cadence Design System, San Jose, Calif. Next, block 604 depicts creating a technology file that includes a description of the third dimension (z-dimension) of the package. Thus, this file will include information about the thickness of each layer of the package. The technology file also includes information about the characteristics of the materials that will be used to implement the package. Thereafter, block 606 illustrates executing shape processing in order to translate the package geometry into a shape file, thus producing a plurality of non-uniform areas for each layer. This step is described in more detail below with regard to FIG. 7.

The process then passes to block 608 which depicts generating a pin-to-node correlation. The pin-to-node correlation provides information used in subsequent modeling that takes into account how other devices that may be connected to the ports of the package will interact with the package. This information is used to determine whether the package can support the devices that may be coupled to it. Block 610, then, illustrates using the technology file, the shape file, and the pin-to-node correlation to calculate the resistance of each area defined by the shape processing step. The process of calculating a resistance to represent an area of a layer and to represent a via is well known in the prior art. Thus, at this point a group of separate resistances has been calculated. Next, block 612 illustrates combining all of these resistances to create a resistor netlist which represents the entire package as a whole. The resistance of each layer and the resistance for each via are combined to create a resistive netlist that represents each area of each layer as well as the manner in which each layer may be electrically connected to the other layers. Block 614, then, depicts verifying the package as a whole using the resulting resistive netlist to determine whether the package meets the expected requirements. The process then terminates as illustrated by block 616.

Figure 7:
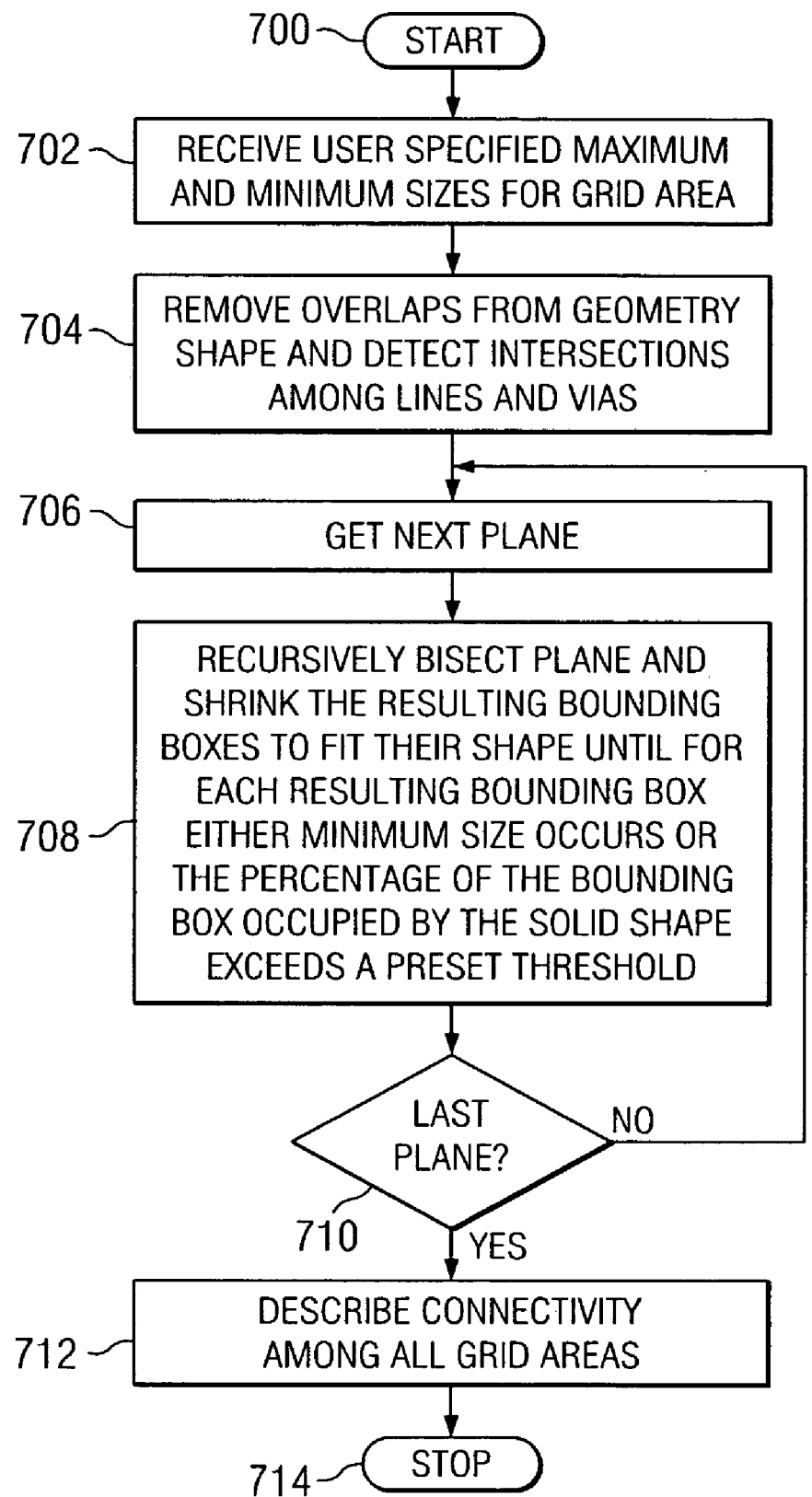
FIG. 7 illustrates a high level flow chart which depicts generating a shape file in accordance with the present invention.

FIG. 7 illustrates a high level flow chart which depicts generating a shape file in accordance with the present invention. The process starts as depicted by block 700 and thereafter passes to block 702 which illustrates receiving a user specified maximum and minimum size for the areas, also referred to herein as grid blocks or bounding boxes. Next, block 704 depicts removing overlaps from the geometric shape and detecting intersections among lines and vias. Thus, the manner in which the layers are interconnected using vias is determined. Each via will be represented as a resistance in the resulting resistive netlist. Block 706, then, illustrates getting the next plane of a layer. Thereafter, block 708 which depicts recursively bisecting the plane and shrinking the resulting bounding boxes to fit the shape until for each resulting bounding box either the minimum size occurs, or the percentage of the bounding box occupied by a solid shape exceeds a preset threshold. This recursive process is depicted by FIGS. 5a–5d.

Block 710, then, illustrates a determination of whether or not this is the last plane included in any layer of the package. If a determination is made that this is not the last plane of the package, the process passes back to block 706. If a determination is made that this is the last plane of the package, the process passes to block 712. At this time each plane included in each layer in the package has been analyzed. Block 712, then, depicts describing the connectivity among all grid areas of all layers. The separate resistances of each grid area are not truly separate. The grid areas act together to form the entire package. Therefore, the way each grid area is electrically connected to the other grid areas must also be taken into account. This step describes determining how each grid area in a layer interacts with the remaining grid areas in that layer as well as grid areas in other layers using vias in order to form the entire package. The process then terminates as illustrated by block 714.

Figure 8:
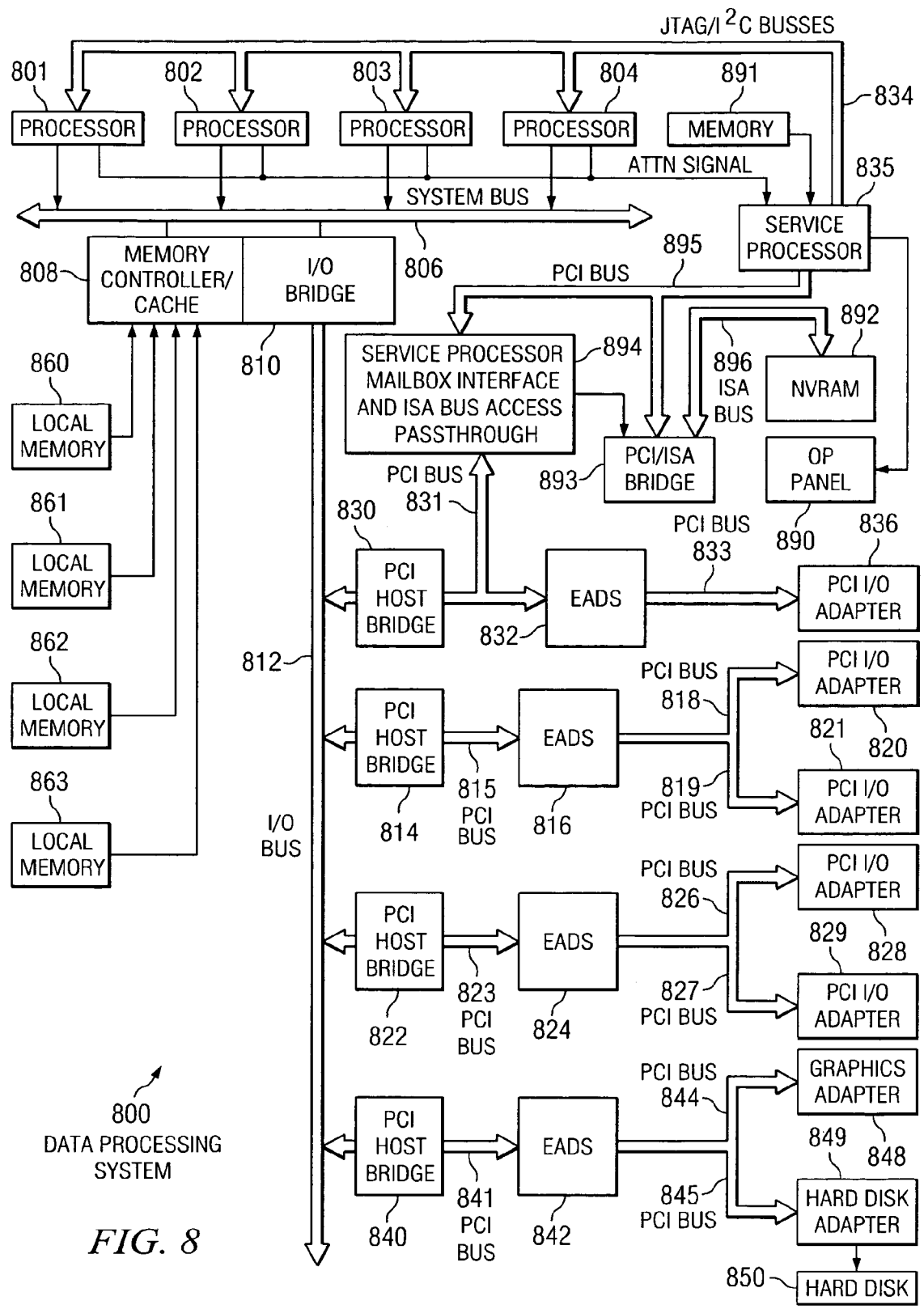
FIG. 8 illustrates a detailed block diagram of a data processing system in which the present invention may be implemented.

FIG. 8 illustrates a detailed block diagram of a data processing system in which the present invention may be implemented. Data processing system 800 may be a symmetric multiprocessor (SMP) system including a plurality of processors 801, 802, 803, and 804 connected to system bus 806. For example, data processing system 800 may be an IBM RS/6000, a product of International Business Machines Corporation in Armonk, N.Y., implemented as a server within a network. Alternatively, a single processor system may be employed. Also connected to system bus 806 is memory controller/cache 808, which provides an interface to a plurality of local memories 860–863. I/O bus bridge 810 is connected to system bus 806 and provides an interface to I/O bus 812. Memory controller/cache 808 and I/O bus bridge 810 may be integrated as depicted.

Data processing system 800 may be a logically partitioned data processing system. Thus, data processing system 800 may have multiple heterogeneous operating systems (or multiple instances of a single operating system) running simultaneously. Each of these multiple operating systems may have any number of software programs executing within it. Data processing system 800 is logically partitioned such that different I/O adapters 820–821, 828–829, 836, and 848–849 may be assigned to different logical partitions.

Peripheral component interconnect (PCI) Host bridge 814 connected to I/O bus 812 provides an interface to PCI local bus 815. A number of Input/Output adapters 820–821 may be connected to PCI bus 815. Typical PCI bus implementations will support between four and eight I/O adapters (i.e. expansion slots for add-in connectors). Each I/O Adapter 820–821 provides an interface between data processing system 700 and input/output devices such as, for example, other network computers, which are clients to data processing system 800.

An additional PCI host bridge 822 provides an interface for an additional PCI bus 823. PCI bus 823 is connected to a plurality of PCI I/O adapters 828–829 by a PCI bus 826–827. Thus, additional I/O devices, such as, for example, modems or network adapters may be supported through each of PCI I/O adapters 828–829. In this manner, data processing system 800 allows connections to multiple network computers.

A memory mapped graphics adapter 848 may be connected to I/O bus 812 through PCI Host Bridge 840 and EADS 842 (PCI-PCI bridge) via PCI buses 844 and 845 as depicted. Also, a hard disk 850 may also be connected to I/O bus 812 through PCI Host Bridge 840 and EADS 842 via PCI buses 841 and 845 as depicted.

A PCI host bridge 830 provides an interface for a PCI bus 831 to connect to I/O bus 812. PCI bus 831 connects PCI host bridge 830 to the service processor mailbox interface and ISA bus access pass-through logic 894 and EADS 832. The ISA bus access pass-through logic 894 forwards PCI accesses destined to the PCI/ISA bridge 893. The NVRAM storage is connected to the ISA bus 896. The Service processor 835 is coupled to the service processor mailbox interface 894 through its local PCI bus 895. Service processor 835 is also connected to processors 801–804 via a plurality of JTAG/I$^2$C buses 834. JTAG/I$^2$C buses 834 are a combination of JTAG/scan busses (see IEEE 1149.1) and Phillips I$^2$C busses. However, alternatively, JTAG/I$^2$C buses 834 may be replaced by only Phillips I$^2$C busses or only JTAG/scan busses. All SP-ATTN signals of the host processors 801, 802, 803, and 804 are connected together to an interrupt input signal of the service processor. The service processor 835 has its own local memory 891, and has access to the hardware op-panel 890.

When data processing system 800 is initially powered up, service processor 835 uses the JTAG/scan buses 834 to interrogate the system (Host) processors 801–804, memory controller 808, and I/O bridge 810. At completion of this step, service processor 835 has an inventory and topology understanding of data processing system 800. Service processor 835 also executes Built-In-Self-Tests (BISTs), Basic Assurance Tests (BATs), and memory tests on all elements found by interrogating the system processors 801–804, memory controller 808, and I/O bridge 810. Any error information for failures detected during the BISTs, BATs, and memory tests are gathered and reported by service processor 835.

Those of ordinary skill in the art will appreciate that the hardware depicted in FIG. 8 may vary. For example, other peripheral devices, such as optical disk drives and the like, also may be used in addition to or in place of the hardware depicted. The depicted example is not meant to imply architectural limitations with respect to the present invention.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A system for determining a voltage drop across an entire integrated circuit package, said system comprising:

a geometric description of said entire integrated circuit package including a description of each layer included in said package;

said system including a CPU executing code for subdividing each layer included in said description into a plurality of non-uniform areas;

said CPU executing code for determining a resistive netlist of said entire integrated circuit package that represents said entire integrated circuit package as a whole utilizing said plurality of non-uniform areas;

wherein said CPU executing code for subdividing said description into a plurality of non-uniform areas further comprises one of:

said CPU executing code for recursively bisecting each share in said description using a bounding box and then shrinking said bounding box to fit said shape until for each resulting bounding box a minimum size occurs; and said CPU executing code for recursively bisecting each shape in said description using a bounding box and then shrinking said bounding box to fit said shape until for each resulting bounding box a percentage of said resulting bounding box is occupied by a solid shape that exceeds a preset threshold.

2. The system according to claim 1, further comprising: said CPU executing code for simulating said package utilizing said netlist to determining a voltage drop across said entire integrated circuit package.

3. The system according to claim 1, further comprising:

said CPU executing code for determining a resistance of each one of said plurality of areas; and said CPU executing code for determining a resistive netlist of said entire integrated circuit package by combining said resistance for each one of said plurality of areas.

4. The system according to claim 1, further comprising:

said CPU executing code for determining a connectivity among said plurality of areas; and said CPU executing code for determining a resistive netlist of said entire integrated circuit package by combining said resistance for each one of said plurality of areas utilizing said connectivity.

5. The system according to claim 1, further comprising: said plurality of non-uniform areas including a plurality of non-uniform planes, lines, and vias.

6. The system according to claim 1, further comprising: a technology file that includes a description of characteristics of materials to be used to create said package.

7. The system according to claim 1, further comprising: a technology file that includes a description of a thickness of each layer in said description.

8. The system according to claim 1, further comprising:

a geometric description of each wiring layer included in said integrated circuit package;

said CPU executing code for subdividing each wiring layer into a plurality of non-uniform areas;

said CPU executing code for determining a plurality of vies used to interconnect each wiring layer with other wiring layers in said package;

said CPU executing code for determining a resistance for each one of said plurality of vias;

said CPU executing code for determining a resistive netlist of said package including utilizing said plurality of non-uniform areas and said resistance determined for each one of said plurality of vias;

said CPU executing code for simulating said package utilizing said netlist to determine a voltage drop across said package.

9. The system according to claim 8, further comprising: said wiring layer being a power layer.

10. The system according to claim 8, further comprising: said wiring layer being a ground layer.

11. The system according to claim 1, further comprising: said package being a ceramic package.

12. The system according to claim 1, further comprising: said package being an organic package.

13. The system according to claim 1, further comprising: a pin-to-node correlation for devices that will be coupled to said package that describes how said devices will electrically interact with said package.

14. The system according to claim 1, further comprising: geometric description of each layer included in said package;

a technology file that includes a description of characteristics of materials to be used to create said package and a description of a thickness of each layer in said package;

a pin-to-node correlation for devices that will be coupled to said package that describes how said devices will electrically interact with said package;

said CPU executing code for determining a resistance of each one of said plurality of areas utilizing said technology file and said pin-to-node correlation; said CPU executing code for determining a connectivity among said plurality of areas; and said CPU executing coda for determining a resistive netlist of said entire integrated circuit package by combining said resistance for each one of said plurality of areas utilizing said connectivity.

15. A computer program product for determining a voltage drop across an entire integrated circuit package, said product comprising:

instruction means far generating a geometric description of said entire integrated circuit package including a description of each layer included in said package;

instruction means for subdividing each layer included in said description into a plurality of non-uniform areas;

instruction mean for determining a resistive netlist of said entire integrated circuit package that represents said entire integrated circuit package as a whole utilizing said plurality of non-uniform areas;

wherein said instruction means for subdividing said description into plurality of non-uniform areas further comprises one of:

instruction means for recursively bisecting each shape in said description using a bounding box and then shrinking said bounding box to fit said shape until for each resulting bounding box a minimum size occurs; and instruction means for recursively bisecting each shape in said description using a bounding box and then shrinking said bounding box to fit said shape until for each resulting bounding box a percentage of said resulting bounding box is occupied by a solid shape that exceeds a preset threshold.

16. The product according to claim 15, further comprising:

instruction means for simulating said package utilizing said netlist to determine a voltage drop across said entire integrated circuit package.

17. The product according to claim 15, further comprising:

instruction means for determining a resistance of each one of said plurality of areas; and instruction means for determining a resistive netlist of said entire integrated circuit package by combining said resistance for each one of said plurality of areas.

18. The product according to claim 15, further comprising: instruction means for determining a connectivity among said plurality of areas; and instruction means for determining a resistive netlist of said entire integrated circuit package by combining said resistance for each one of said plurality of areas utilizing said connectivity.

19. The product according to claim 15, further comprising:

said plurality of non-uniform areas including a plurality of non-uniform planes, lines, and vias.

20. The product according to claim 15, further comprising: instruction means for creating a technology file that includes a description of characteristics of materials to be used to create said package.

21. The product according to claim 15, further comprising:

instruction means for creating a technology file that includes a description of a thickness of each layer in said description.

22. The product according to claim 15, further comprising instruction means for generating a geometric description of each wiring layer included in said integrated circuit package;

instruction means for subdividing each wiring layer into a plurality of non-uniform areas;

instruction means for determining a plurality of vias used to interconnect each wiring layer with other wiring layers in said package;

instruction means for determining a resistance for each one of said plurality of vias;

instruction means for determining a resistive netlist of said package including utilizing said plurality of non-uniform areas and said resistance determined for each one of said plurality of vias;

instruction means for simulating said package utilizing said netlist to determine a voltage drop across said package.

23. The product according to claim 22, further comprising:

said wiring layer being a power layer.

24. The product according to claim 22, further comprising:

said wiring layer being a ground layer.

25. The product according to claim 15, further comprising:

said package being a ceramic package.

26. The product according to claim 15, further comprising:

said package being an organic package.

27. The product according to claim 15, further comprising:

instruction means for generating a pin-to-node correlation for devices that will be coupled to said package that describes how said devices will electrically interact with said package.

28. The product according to claim 15, further comprising:

instruction means for generating a geometric description of each layer included in said package;

instruction means for creating a technology file that includes a description of characteristics of materials to be used to create said package and a description of a thickness of each layer in said package;

instruction means for generating a pin-to-node correlation for devices that will be coupled to said package that describes how said devices will electrically interact with said package;

instruction means for determining a resistance of each one of said plurality of areas utilizing said technology file and said pin-to-node correlation; instruction means for determining a connectivity among said plurality of areas; and instruction means for determining a resistive netlist of said entire integrated circuit package by combining said resistance for each one of said plurality of areas utilizing said connectivity.

29. A method of characterizing an integrated circuit package having a plurality of layers, the method comprising:

generating a geometric description of the integrated circuit package, wherein the geometric description describes a layer in the plurality of layers;

subdividing the layer geometric description into a plurality of non-uniform areas, wherein the plurality of non-uniform areas includes a first area having a shape;

establishing a first bounding box for the first area, wherein the shape is within the bounding box;

recursively bisecting the first bounding box to form successively smaller resulting bounding boxes, wherein the successively smaller resulting bounding boxes contain a plurality of resulting shapes, and wherein the step of recursively bisecting is performed until one of an unbisected bounding box achieves a specified minimum size or a percentage that a resulting shape occupies of an unbisected bounding box exceeds a preset threshold;

repeating the establishing step and the recursively bisecting step for additional areas in the plurality of non-uniform areas;

repeating the subdividing step, the establishing step, and the recursively bisecting step for other layers in the plurality of layers; and determining a resistive netlist of the integrated circuit package, wherein the resistive netlist utilizing the plurality of non-uniform areas.

30. The method of claim 29 further comprising:
simulating the integrated circuit package utilizing the netlist to determine a voltage drop across the entire integrated circuit package.

31. The method of claim 29 further comprising:
determining a resistance of each one of the plurality of non-uniform areas; and
determining a resistive netlist of the entire integrated circuit package by combining the resistance for each one of the plurality of non-uniform areas.

32. The method of claim 29 further comprising;
determining a connectivity among the plurality of non-uniform areas; and
determining a resistive netlist of the entire integrated circuit package by combining the resistance for each one of the plurality of non-uniform areas utilizing the connectivity.

33. The method of claim 29, wherein the plurality of non-uniform areas include a plurality of non-uniform planes, lines, and vias.

34. The method of claim 29, further comprising:
creating a technology file that includes a description of characteristics of materials to be used to create the integrated circuit package.

35. The method of claim 29, further comprising: creating a technology tile that includes a description of a thickness of a layer in the plurality of layers.

36. The method according to claim 29, further comprising:

generating a geometric description of each wiring layer included in the integrated circuit package;

subdividing each wiring layer into a plurality of non-uniform areas;

determining a plurality of vias used to interconnect each wiring layer with other wiring layers in the package;

determining a resistance for each one of the plurality of vias;

determining a resistive netlist of the package including utilizing the plurality of non-uniform areas and the resistance determined for each one of the plurality of vias;

simulating the integrated circuit package utilizing the netlist to determine a voltage drop across the integrated circuit package.

37. The method of claim 36 further wherein the wiring layer is a power layer.

38. The method of claim 36 wherein the wiring layer is a ground layer.

39. The method of claim 29, wherein the integrated circuit package is a ceramic package.

40. The method of claim 29, wherein the package is an organic package.

41. The method of claim 29, further comprising:
generating a pin-to-node correlation for devices adapted to be coupled to the package, wherein the pin-to-node correlation describes how the devices will electrically interact with the integrated circuit package.

42. The method of claim 29, further comprising:
creating a technology file that includes a description of characteristics of materials to be used to create the integrated circuit package and a description of a thickness of each layer in the package;

generating a pin-to-node correlation for devices adapted to be coupled to the package, wherein the pin-to-node correlation describes how the devices will electrically interact with the integrated circuit package;

determining a resistance of each one of the plurality of areas utilizing the technology file and the pin-to-node correlation;

determining a connectivity among the plurality of areas; and determining a resistive netlist of the entire integrated circuit package by combining the resistance for each one of the plurality of areas utilizing the connectivity.

* * * * *